United States Patent
Lee et al.

(10) Patent No.: US 11,780,945 B2
(45) Date of Patent: Oct. 10, 2023

(54) BINDER FOR PREPARING POSITIVE ELECTRODE FOR LITHIUM-SULFUR SECONDARY BATTERY, AND METHOD FOR PREPARING POSITIVE ELECTRODE USING SAME

(71) Applicant: LG CHEM, LTD., Seoul (KR)

(72) Inventors: Choonghyeon Lee, Daejeon (KR); Kyung Oh Kim, Daejeon (KR); Doo Kyung Yang, Daejeon (KR); Sung Soo Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 882 days.

(21) Appl. No.: 16/646,635

(22) PCT Filed: Sep. 18, 2018

(86) PCT No.: PCT/KR2018/010974
§ 371 (c)(1),
(2) Date: Mar. 12, 2020

(87) PCT Pub. No.: WO2019/066352
PCT Pub. Date: Apr. 4, 2019

(65) Prior Publication Data
US 2020/0299444 A1    Sep. 24, 2020

(30) Foreign Application Priority Data

Sep. 29, 2017 (KR) .......... 10-2017-0127682
Sep. 14, 2018 (KR) .......... 10-2018-0110347

(51) Int. Cl.
| | |
|---|---|
| *C08F 220/30* | (2006.01) |
| *H01M 4/62* | (2006.01) |
| *H01M 10/052* | (2010.01) |
| *H01M 4/02* | (2006.01) |
| *H01M 4/13* | (2010.01) |

(52) U.S. Cl.
CPC .......... *C08F 220/302* (2020.02); *H01M 4/13* (2013.01); *H01M 4/622* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2013/0280606 A1 | 10/2013 | Sekine | |
| 2013/0323592 A1 | 12/2013 | Lee et al. | |
| 2014/0302398 A1 | 10/2014 | Gor et al. | |
| 2015/0188129 A1 | 7/2015 | Park et al. | |
| 2015/0243996 A1 | 8/2015 | Liu et al. | |
| 2018/0114988 A1 | 4/2018 | Yoon et al. | |
| 2020/0176775 A1* | 6/2020 | Kim .............. | C08F 220/286 |

FOREIGN PATENT DOCUMENTS

| | | |
|---|---|---|
| CN | 103258990 A | 8/2013 |
| JP | WO2012/091001 A1 | 6/2014 |
| JP | 2015-501519 A | 1/2015 |
| JP | 2015-128051 A | 7/2015 |
| KR | 10-2004-0015999 A | 2/2004 |
| KR | 10-2015-0093874 A | 8/2015 |
| KR | 10-2017-0050078 A | 5/2017 |
| WO | WO 2017/074004 A1 | 5/2017 |
| WO | WO 2017/074551 A1 | 5/2017 |
| WO | WO-2019022359 A1 * | 1/2019 .......... C08F 220/06 |

OTHER PUBLICATIONS

International Search Report issued in PCT/KR2018/010974 (PCT/ISA/210), dated Feb. 28, 2019.
Li et al., "Water Soluble Binder, an Electrochemical Performance Booster for Electrode Materials with High Energy Density", Advanced Energy Materials, Special Issue: Next Generation Batteries: Aim for the Future, vol. 7, Issue 24, Dec. 20, 2017, pp. 1701185 (1-30).
"DSDMA C12H18O4S2 ChemSpider," ChemSpider, Feb. 10, 2023, XP093022918, 3 pages total.
"RAFT-mediated control of nanogel structure and reactivity: Chemical, physical and mechanical properties of monomer-dispersed nanogel compositions," Pocket Dentistry, Nov. 25, 2017, XP093022916, 6 pages total.
European Communication pursuant to Article 94(3) EPC for corresponding European Application No. 18861319.4 dated Feb. 17, 2023.
Erdelen et al., "Self-Assembled Disulfide-Functionalized Amphiphilic Copolymers on Gold," Langmuir, American Checmical Society, US, vol. 10, No. 4, Apr. 1, 1994, XP000566926, pp. 1246-1250.
Extended European Search Report for European Application No. 18861319.4, dated Jun. 3, 2020.

* cited by examiner

*Primary Examiner* — Robert S Carrico
(74) *Attorney, Agent, or Firm* — Birch, Stewart, Kolasch & Birch, LLP

(57) ABSTRACT

A binder for preparing a positive electrode of a lithium-sulfur secondary battery, a composition including the binder, a positive electrode including the composition and a lithium-sulfur secondary battery including the positive electrode. The binder includes an acrylic polymer, and the acrylic polymer includes a unit formed from a hydroxyphenyl-based monomer or a disulfide-based monomer. The acrylic polymer may include 1 to 20 wt. % of units formed from the hydroxyphenyl-based monomer. The acrylic polymer may include 1 to 20 wt. % of units formed from the disulfide-based monomer. Such a battery has increased long-term stability due to suppression of leaching of the sulfur-based materials by absorption of lithium polysulfides.

9 Claims, No Drawings

BINDER FOR PREPARING POSITIVE ELECTRODE FOR LITHIUM-SULFUR SECONDARY BATTERY, AND METHOD FOR PREPARING POSITIVE ELECTRODE USING SAME

TECHNICAL FIELD

This application claims the benefits of priorities based on Korean Patent Application No. 10-2017-0127682, filed on Sep. 29, 2017 and Korean Patent Application No. 10-2018-0110347, filed on Sep. 14, 2018, the entire contents of which are incorporated herein by reference.

The present invention relates to a binder for preparing a positive electrode of a lithium-sulfur secondary battery and a method of preparing the positive electrode using the same. More particularly, the present invention relates to a binder for preparing a positive electrode of a lithium-sulfur secondary battery, which comprises an acrylic copolymer including a hydroxyphenyl-based monomer polymerization unit or a disulfide-based monomer polymerization unit, and a method of preparing the positive electrode using the same.

BACKGROUND ART

As the application area of secondary battery is expanding to the electric vehicles (EV) and the energy storage system (ESS), the lithium-ion secondary batteries with relatively low weight-to-energy storage density (~250 Wh/kg) are facing limitations in application to such products. Alternatively, since the lithium-sulfur secondary battery can achieve the theoretically high weight-to-energy storage density (~2,600 Wh/kg), it is attracting attention as a next-generation secondary battery technology.

The lithium-sulfur secondary battery system is a battery system using a sulfur-based material having an S—S bond (sulfur-sulfur bond) as a positive electrode active material and using lithium metal as a negative electrode active material. Sulfur, the main material of the positive electrode active material, is very abundant in nature. And also, sulfur has low toxicity, and has a low atomic weight.

In the lithium-sulfur secondary battery, when discharging the battery, lithium which is a negative electrode active material is oxidized while releasing electron and thus ionized, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the S—S bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic $S_8$ structure, which is converted to lithium polysulfide ($LiS_x$) by the reduction reaction. When the lithium polysulfide is completely reduced, lithium sulfide ($Li_2S$) is produced.

Although the lithium-sulfur secondary battery has an advantage of high energy storage density, there are many problems in actual application. Specifically, there may be a problem of the instability of lithium metal used as the negative electrode, a problem of the low conductivity of the positive electrode, a problem of the sublimation of the sulfur-based material in preparing the electrode, and a problem of the loss of the sulfur-based material in the repetitive charging/discharging process. In particular, the problem of the leaching of sulfur-based materials in the positive electrode, which is caused when lithium polysulfide produced from positive electrode during the discharging process migrates to the lithium metal surface of the negative electrode during the charging process and is reduced, is a problem that must be overcome in order to commercialize the lithium-sulfur secondary battery.

There have been various attempts in the art to inhibit the leaching of such sulfur-based materials. Examples thereof may include a method of adding an additive having a property of adsorbing sulfur to the positive electrode mixture, a method of treating the surface of sulfur with a substance including an hydroxide groups of the coating element, an oxyhydroxide groups of the coating element, an oxycarbonate groups of the coating element or a hydroxycarbonate groups of the coating element, and a method of making the nano-structured carbon materials and restricting the lithium polysulfides thereto.

However, in the case of adding the additive, there is a problem of deterioration in conductivity and a risk of side reaction. In the case of the surface treatment technique, there are disadvantages that the active material is lost during the treatment process and it is not preferable from the viewpoint of cost. In the case of the carbon nanostructures, there is a disadvantage that the preparation is complicated.

In addition, these conventional techniques have a problem that the capacity and cycle characteristics of the lithium-sulfur secondary battery cannot be greatly improved.

PRIOR ART LITERATURE

Patent Literature (Patent Literature 1) Korean Patent Laid-Open Publication No. 10-2015-0093874.

DISCLOSURE

Technical Problem

In order to solve the problems above, the present invention provides a binder for preparing a positive electrode of a lithium-sulfur secondary battery wherein the binder comprises hydroxyphenyl functional groups or disulfide functional groups, and thus the leaching of the sulfur-based material is suppressed through the adsorption of the lithium polysulfides by the functional groups and the rigidity is increased by the binder having a glass transition temperature ($T_g$) of room temperature or higher and thereby the cycle characteristics of the battery can be improved.

Technical Solution

According to the first aspect of the present invention, the present invention provides a binder for preparing a positive electrode of a lithium-sulfur secondary battery comprising an acrylic polymer wherein the acrylic polymer includes a unit formed from a hydroxyphenyl-based monomer or a disulfide-based monomer.

In one embodiment of the present invention, the acrylic polymer comprises 1 to 20 wt. % of units formed from the hydroxyphenyl-based monomer.

In one embodiment of the present invention, the acrylic polymer comprises 1 to 20 wt. % of units formed from the disulfide-based monomer.

According to the second aspect of the present invention, the present invention provides a composition for the preparation of the positive electrode of the lithium-sulfur secondary battery comprising the above binder, a positive electrode active material, and an electrically conductive material.

According to the third aspect of the present invention, the present invention provides a positive electrode comprising a current collector and a positive electrode active material layer, where the positive electrode active material layer is formed by a process including coating the above composition on the current collector.

According to the fourth aspect of the present invention, the present invention provides a lithium-sulfur secondary battery including the above positive electrode.

Advantageous Effects

The binder for the positive electrode of the lithium-sulfur secondary battery according to the present invention has hydroxyphenyl functional groups or disulfide functional groups inside the binder, and thus the leaching of the sulfur-based materials is suppressed through the adsorption of the lithium polysulfides by the functional groups.

Since the binder has the hydroxyphenyl or disulfide functional groups therein, the binder has a glass transition temperature ($T_g$) of room temperature or higher, thereby increasing the rigidity of the positive electrode made using the binder.

Therefore, the lithium-sulfur secondary battery manufactured using the binder according to the present invention has an effect of increasing the long-term stability by the role of the binder described above.

BEST MODE

The embodiments provided in accordance with the present invention can be all achieved by the following description. It is to be understood that the following description describes preferred embodiments of the present invention, and also it is to be understood that the present invention is not necessarily limited thereto.

The present invention provides a binder for the preparation of the positive electrode of the lithium-sulfur secondary battery comprising an acrylic polymer containing a unit formed from a hydroxyphenyl-based monomer or a disulfide-based monomer, as a way to fundamentally inhibit the leaching of sulfur from the positive electrode of the lithium-sulfur secondary batter.

Polyvinylidene difluoride (PVDF), which has excellent electrochemical stability, is generally used as a binder for the positive electrode of the lithium-sulfur secondary battery in the related art. However, polyvinylidene difluoride has a low solubility with respect to a common solvent, and the choice of an available solvent is limited due to this property. Although high boiling point polar solvents such as N-methyl-2-pyrrolidone (NMP) may be used as the available solvent for polyvinylidene difluoride, when considering the fact that if the above-mentioned solvents are used, long-time high-temperature drying is necessary for drying the battery electrode, Therefore, the use of the above solvents is undesirable because it may cause a serious drop in the capacity of the electrode due to the sublimation of sulfur in the drying process.

The binder comprising the acrylic polymer including a unit formed from the hydroxyphenyl-based monomer or the disulfide-based monomer according to the present invention has a low solubility to the electrolyte solution composed of the ether-based mixture. Due to its low solubility, the binder can physically adsorb the electrode material. In addition, since the binder participates in the redox reaction of the polysulfides and helps to change from a liquid form in which sulfur is liable to leach to a solid form in which sulfur is difficult to leach, it can prevent the electrode material from leaching into the electrolyte solution, thereby forming a stable electrode. Since the polymer is a water- soluble polymer and makes it possible to dry the electrode at a temperature lower than the sublimation temperature of sulfur, if the binder comprising the acrylic polymer containing a unit formed from the hydroxyphenyl-based monomer or the disulfide-based monomer is used, the processability is excellent. The unit formed from the hydroxyphenyl-based monomer or the disulfide-based monomer constituting the acrylic polymer essentially contains polar functional groups that exhibit water solubility. These polar functional groups can chemically inhibit the leaching of sulfur-based materials by strongly interacting with sulfur.

Binder

The present invention provides a binder for the preparation of a positive electrode of a lithium-sulfur secondary battery comprising an acrylic polymer containing a unit formed from a hydroxyphenyl-based monomer or a disulfide-based monomer. In this case, a "unit" is a part of constituting polymer and refers to a moiety derived from a particular monomer. For example, a unit formed from the hydroxyphenyl-based monomer refers to a part derived from the hydroxyphenyl-based monomer in the polymer, and a unit formed from the disulfide-based monomer refers to a part derived from the disulfide-based monomer in the polymer.

The acrylic polymer, which is a component of the binder for the preparation of the positive electrode of the lithium-sulfur secondary battery according to the present invention, may contain 1 to 20 wt. %, preferably 2 to 15 wt. %, more preferably 3 to 10 wt. % of the units formed from the hydroxyphenyl-based monomer. The hydroxyphenyl-based monomer has a phenyl group therein and means a compound in which at least one of the hydrogens bound to the benzene ring of the phenyl group is substituted with a hydroxy group. The hydroxyphenyl-based monomer has a polar functional group. Thus, the polymer containing the monomer has not only high solubility in water but also has an effect of helping the reduction reaction of polysulfides through interaction with lithium polysulfides and inhibiting the leaching of the sulfur-based materials into the electrolyte solution. When the content of the units formed from the hydroxyphenyl-based monomer in the polymer is less than 1 wt. %, such effect is insignificant. When the content is more than 20 wt. %, the increase rate of the effect with the increase of content is decreased and the synergistic effects with the introduction of other functional groups are also deteriorated. According to one embodiment of the present invention, the hydroxyphenyl-based monomer, in which two of the hydrogens bound to the benzene ring of the phenyl group are substituted with hydroxy groups, may be a monomer containing a catechol functional group, and more specifically, the hydroxyphenyl-based monomer may be one compound selected from the group consisting of 1,2-dihydroxyphenyl ethyl methacrylate, 1,2-dihydroxyphenyl butyl methacrylate, 1,2-dihydroxyphenyl dodecyl methacrylate, 3,4-dihydroxyphenyl ethyl methacrylate and combinations thereof.

The acrylic polymer, which is a component of the binder for the preparation of the positive electrode of the lithium-sulfur secondary battery according to the present invention, may contain 1 to 20 wt. %, preferably 2 to 15 wt. %, more preferably 3 to 10 wt. % of the units formed from the disulfide-based monomer. The disulfide-based monomer refers to a compound containing an S—S bond in the monomer. The S—S bond in the disulfide-based monomer interacts with the -S-S- portion of the lithium polysulfide leached into the electrolyte solution and thus adsorbs a lithium polysulfide molecule and has the effect of inhibiting the outflow of the sulfur-based material in the positive electrode to the electrolyte solution. When the content of the units formed from the disulfide-based monomer in the polymer is less than 1 wt. %, such effect is insignificant. When the content is more than 20 wt. %, the increase rate of the effect with the increase of the content is decreased and the synergistic effects with the introduction of other functional groups are also deteriorated. According to one embodiment of the present invention, the disulfide-based monomer may be a compound selected from the group consisting of allyl disulfide, disulfide dimethacrylate, hydroxyethyl pyridyl disulfide, 2-(pyridyl disulfide)-methyl methacrylate, and combinations thereof.

The acrylic polymer according to the present invention has a glass transition temperature of room temperature (25° C.) or higher, more specifically 25 to 50° C. Such glass transition temperature is higher than that of a conventional acrylic polymer for a binder, which has a glass transition temperature of less than 0° C. This high glass transition temperature value means that the rigidity of the binder is increased, thereby improving the cycle characteristics of the battery.

The above-described polymers can be prepared in various ways. After blending the necessary monomers according to the above conditions, the polymer can be polymerized by polymerizing the mixture of monomers by solution polymerization, bulk polymerization, suspension polymerization or emulsion polymerization. According to one embodiment of the present invention, the polymerization method may preferably be the solution polymerization. The specific conditions for the solution polymerization are not particularly limited as long as they are conditions known in the art. However, the solvent for the solution polymerization may preferably be a solvent having a boiling point of 110° C. or less in order to use the polymer solution as it is without further purification after solution polymerization. The solvent may be selected from the group consisting of acetone, methanol, ethanol, acetonitrile, isopropanol, methyl ethyl ketone and water. According to one embodiment of the present invention, the solvent may preferably be water when considering the above-mentioned boiling point and environmental effects.

Positive Electrode Active Layer

The present invention provides a positive electrode active layer formed from a composition including the above-mentioned binder, a positive electrode active material, and an electrically conductive material.

The ratio of the binder in the composition may be selected in consideration of the desired performance of the battery. According to one embodiment of the present invention, the composition includes 0.01 to 10 parts by weight, preferably 1 to 8 parts by weight, more preferably 2 to 6 parts by weight of the binder based on 100 parts by weight of solid content in the composition. The solid in the composition as a basis of the content means a solid component in the composition except for the solvent and the monomer that can be contained in the binder and the like.

In addition to the binder according to the present invention, binders generally used in the related art may be additionally used. The additional binder may be at least one binder selected from the group consisting of fluorine resin based binders including polyvinylidene fluoride (PVdF) or polytetrafluoroethylene (PTFE); rubber based binders including styrene-butadiene rubber, acrylonitrile-butadiene rubber, and styrene-isoprene rubber; polyalcohol based binders; polyolefin based binders including polyethylene and polypropylene; polyimide-based binders; polyester-based binders; mussel adhesive; and silane-based binders. According to one embodiment of the present invention, the additional binder may additionally be included in the composition in an amount of 0.01 to 10.0 parts by weight based on 100 parts by weight of the solid content in the composition.

The ratio of the positive electrode active material in the composition may be selected in consideration of the desired performance of the battery. According to one embodiment of the present invention, the composition contains 30 to 95 parts by weight, preferably 50 to 93 parts by weight, more preferably 70 to 90 parts by weight of positive electrode active material relative to 100 parts by weight of solid content in the composition. The positive electrode active material may be selected from elemental sulfur ($S_8$), a sulfur-carbon composite, a sulfur-based compound, or a mixture thereof, but is not limited thereto. Specifically, the sulfur-based compound may be $Li_2S_n(n≥1)$, an organic sulfur compound or a carbon-sulfur polymer ($(C_2S_x)_n$: x=2.5~50, n≥2). They are applied in combination with electrically conductive material because sulfur is not electrically conductive by itself.

In addition, the sulfur-carbon composite is one embodiment of a positive electrode active material in which carbon and sulfur are mixed to reduce the leaching of sulfur into the electrolyte and increase the electrical conductivity of the electrode containing sulfur.

The carbon material constituting the sulfur-carbon composite may be crystalline or amorphous carbon, and may be an electrically conductive carbon. Specifically, the carbon material may be any one selected from the group consisting of graphite, graphene, Super P, carbon black, Denka black, acetylene black, Ketjen black, channel black, furnace black, lamp black, thermal black, carbon fiber, carbon nanofiber, carbon nanotube, carbon nanowire, carbon nano ring, carbon fabric, and fullerene ($C_{60}$).

Such sulfur-carbon composite may include sulfur-carbon nanotube composites and the like. Specifically, the sulfur-carbon nanotube composite includes a carbon nanotube aggregate having a three-dimensional structure and sulfur or sulfur compounds provided on at least a part of an inner surface and outer surface of the carbon nanotube aggregate.

Since the sulfur-carbon nanotube composite according to one embodiment of the present invention contains sulfur existing inside the three-dimensional structure of the carbon nanotube, if the soluble polysulfide can be located inside the carbon nanotube even if the soluble polysulfide is generated by the electrochemical reaction, the collapse of structure of the positive electrode can be suppressed by keeping the entangled structure in three dimensions even when leaching the polysulfide. As a result, the lithium-sulfur secondary battery including the sulfur-carbon nanotube composite has an advantage that a high capacity can be implemented even at a high loading. Also, the sulfur or sulfur-based compounds may be included in the inner pores of the carbon nanotube aggregate.

The carbon nanotube refers to a linear electrically conductive carbon and specifically, the carbon nanotube may be carbon nanotube (CNT), graphitic nanofiber (GNF), carbon nanofiber (CNF), or activated carbon fiber (ACF). Both single-wall carbon nanotubes (SWCNT) and multi-wall carbon nanotubes (MWCNT) can be used.

According to one embodiment of the present invention, the sulfur-carbon composite is prepared by impregnating sulfur or sulfur-based compounds on the outer surface and inside of the carbon, and can optionally be subjected to a step of adjusting the diameter of carbon before, after, or both before and after the impregnating step. The impregnating step may be carried out by mixing carbon with a powder of sulfur or sulfur-based compounds and then heating to impregnate carbon with molten sulfur or sulfur-based compounds, and such mixing can be performed by a dry ball mill method, a dry jet mill method or a dry dynomill method.

The ratio of the electrically conductive material in the composition may be selected in consideration of the desired performance of the battery. According to one embodiment of the present invention, the composition comprises 2 to 60 parts by weight, preferably 3 to 40 parts by weight, more preferably 4 to 20 parts by weight of the electrically conductive material relative to 100 parts by weight of the solid content in the composition. The electrically conductive material may be graphite such as natural graphite or artificial graphite; carbon black such as carbon black, acetylene black, Ketjen black, channel black, furnace black, lamp black or thermal black; electrically conductive fibers such as carbon fiber or metal fiber; metal powder such as carbon fluoride, aluminum or nickel powder; electrically conductive whiskey such as zinc oxide or potassium titanate; electrically conductive metal oxides such as titanium oxide; or polyphenylene derivatives, but is not limited thereto.

The composition may further comprise other components, in addition to the binder, the positive electrode active material and the electrically conductive material described above. Additional components to the composition may include cross-linking agents or dispersing agents for the electrically conductive materials. The cross-linking agent may be a cross-linking agent having two or more functional groups capable of reacting with the cross-linkable functional group of the polymer in order for the polymer of the binder to form a cross-linking network. The cross-linking agent may be selected from, but not limited to, an isocyanate cross-linking agent, an epoxy cross-linking agent, an aziridine cross-linking agent, or a metal chelate cross-linking agent. According to one embodiment of the present invention, the cross-linking agent may preferably be the isocyanate cross-linking agent. The cross-linking agent may be added to the composition in an amount of 0.0001 to 1 part by weight based on 100 parts by weight of the solid content in the composition.

The dispersing agent for the electrically conductive material helps the dispersion of the non-polar carbon based electrically conductive material and thus the formation of a paste. The dispersing agent for the electrically conductive material is not particularly limited, but may be selected from cellulose-based compounds including carboxymethyl cellulose (CMC), starch, hydroxypropyl cellulose, and regenerated cellulose. According to one embodiment of the present invention, the dispersing agent for the electrically conductive material may preferably be carboxymethyl cellulose (CMC). The dispersing agent for the electrically conductive material may be added in an amount of 0.1 to 20 parts by weight based on 100 parts by weight of the solid content in the composition.

In forming the composition, a solvent may be used. The type of the solvent can be appropriately set in consideration of the desired performance of the battery and the like. According to one embodiment of the present invention, the solvent may be selected from organic solvent such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydrofuran, 2-methyltetrahydrofuran, dimethyl sulfoxide, formamide, dimethylformamide, acetonitrile, nitromethane, methyl formate, methyl acetate, triester phosphate, trimethoxymethane, sulfolane, methyl sulfolane, 1,3-dimethyl-2-imidazolidinone, propylene carbonate derivatives, tetrahydrofuran derivatives, methyl propionate or ethyl propionate, and water. Since the binder of the present invention has a solubility in water of 10 or more, water is preferably used as a solvent in the present invention. When water is used as a solvent, it is advantageous in terms of drying temperature and environment.

The thickness of the active layer formed by the composition may be suitably selected in consideration of the desired performance, and is not particularly limited. According to one embodiment of the present invention, the active layer may preferably have a thickness of 1 to 200 μm.

Lithium-Sulfur Secondary Battery

The present invention provides a lithium-sulfur secondary battery having improved cycle performance by forming an active layer on a current collector to prepare a positive electrode, and then adding components of a negative electrode, a separator, and an electrolyte solution.

The positive electrode constituting the lithium-sulfur secondary battery according to the present invention includes a positive electrode current collector and a positive electrode active layer formed on the positive electrode current collector. The positive electrode active layer is prepared according to the above description. The positive electrode current collector is not particularly limited as long as it is generally used in the preparation of a positive electrode. According to one embodiment of the present invention, the positive electrode current collector may be at least one material selected from the group consisting of stainless steel, aluminum, nickel, titanium, sintered carbon and aluminum, and if necessary, the surfaces of the above-mentioned materials may be treated with carbon, nickel, titanium or silver. According to one embodiment of the present invention, the positive electrode current collector may be formed in various forms such as film, sheet, foil, net, porous body, foam or nonwoven fabric. The thickness of the positive electrode current collector is not particularly limited and may be set in a suitable range in consideration of the mechanical strength of the positive electrode, the productivity, and the capacity of the battery.

A method of forming the positive electrode active layer on the current collector may be a known coating method and is not particularly limited. For example, the coating method may be a bar coating method, a screen coating method, a doctor blade method, a dipping method, a reverse roll method, a direct roll method, a gravure method, or an extrusion method. The amount of the positive electrode active layer to be coated on the current collector is not particularly limited, and is adjusted in consideration of the thickness of the finally desired positive electrode active layer. Also, before or after the process of forming the positive electrode active layer, a known process required for the preparation of the positive electrode, for example, a rolling or drying process, can be performed.

The electrolyte solution constituting the lithium-sulfur secondary battery according to the present invention is not particularly limited as long as it is a non-aqueous solvent serving as a medium through which ions involved in the electrochemical reaction of the battery can move. According to one embodiment of the present invention, the solvent may be a carbonate-based solvent, an ester-based solvent, an ether-based solvent, a ketone-based solvent, an alcohol-based solvent, or an aprotic solvent. Examples of the carbonate-based solvent may specifically include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), and butylene carbonate (BC), etc. Examples of the ester-based solvent may specifically include methyl acetate, ethyl acetate, n-propyl acetate, 1,1-dimethyl ethyl acetate, methyl propionate, ethyl propionate, γ-butyrolactone, decanolide, valerolactone, mevalonolactone, and carprolactone, etc. Examples of the ether-based solvent may specifically include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, and polyethylene glycol dimethyl ether, etc. Examples of the ketone-based solvent may specifically be cyclohexanone, etc. Examples of the alcohol-based solvent may specifically include ethylalcohol, and isopropylalcohol, etc. Examples of the aprotic solvent may specifically include nitriles such as acetonitrile, amides such as dimethylformamide, dioxolanes such as 1,3-dioxolane (DOL), and sulfolane, etc. The non-aqueous organic solvents may be used alone or in combination of one or more. The mixing ratio when using in combination of one or more can be appropriately adjusted depending on the desired performance of the battery.

The electrolyte solution may further include a lithium salt. The lithium salt can be used without limitation as long as it is a compound capable of providing lithium ion used in the lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, LiN $(C_2F_5SO_3)_2$, $LiN(C_2F_5SO_2)_2$ (lithium bis(perfluoroethylsulfonyl)imide, BETI), LiN $(CF_3SO_2)_2$(lithium bis(trifluoromethanesulfonyl)imide, LiTFSI), $LiN(C_aF_{2a+1}SO_2)(C_bF_{2b+1}SO_2)$ (wherein a and b are natural numbers, preferably 1≤a≤20 and 1≤b≤20), lithium poly[4,4'-(hexafluoroisopropylidene)diphenoxy] sulfonylimide (LiPHFIPSI), LiCl, LiI, or $LiB(C_2O_4)_2$. Among them, a sulfonyl group-containing imide lithium compound such as LiTFSI, BETI or LiPHFIPSI may be more preferable.

The electrolyte solution may further include $LiNO_3$. When the electrolyte solution includes $LiNO_3$, the shuttle suppressing effect can be improved. The electrolyte solution may contain 1 to 50 wt. % of $LiNO_3$ based on the total weight of the electrolyte solution.

The negative electrode of the lithium-sulfur secondary battery according to the present invention includes a negative electrode current collector and a negative electrode active material layer formed on the negative electrode current collector.

The negative electrode active material layer includes a negative electrode active material, a binder, and an electrically conductive material. Examples of the negative electrode active material may be a material capable of reversibly intercalating or deintercalating lithium ion ($Li^+$), a material capable of reacting with lithium ion to reversibly form a lithium-containing compound, lithium metal or a lithium alloy. The material capable of reversibly intercalating or deintercalating lithium ion ($Li^+$) may be, for example, crystalline carbon, amorphous carbon or mixtures thereof. The material capable of reacting with lithium ion to reversibly form a lithium-containing compound may be, for example, tin oxide, titanium nitrate or silicon. The lithium alloy may be, for example, an alloy of lithium (Li) and the metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The binder is not limited to the above-mentioned binders, and can be any binder that can be used as a binder in the art.

The constitution of the current collector and the like, except for the negative electrode active material and the electrically conductive material, can be performed by the materials and methods used in the above-mentioned positive electrode.

The separator for the lithium-sulfur secondary battery according to the present invention is a physical separator having a function of physically separating electrodes. The separator can be used without special restrictions, as long as it is used as a conventional separator. Particularly, a separator with excellent electrolyte solution humidification ability while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of a porous, nonconductive or insulating material having a porosity of 30 to 50%.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used, and a nonwoven fabric made of glass fiber having high melting point or the like can be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical stiffness cannot be ensured and thus a problem of short circuit of the battery occurs. However, if a film-type separator and a polymer nonwoven fabric buffer layer are used together, the mechanical strength can also be ensured together with the improvement effect of the battery performance due to the adoption of the buffer layer.

According to one preferred embodiment of the present invention, the ethylene homopolymer (polyethylene) polymer film is used as a separator, and the polyimide nonwoven fabric is used as a buffer layer. In that case, the polyethylene polymer film preferably has a thickness of 10 to 25 μm and a porosity of 40 to 50%.

Hereinafter, examples of the present invention will be described in order to facilitate understanding of the present invention. However, the following examples are provided to facilitate understanding of the present invention, but the present invention is not limited thereto.

EXAMPLES

1. Preparation of Binder

Preparation Example 1: Binder of Polymer Containing Hydroxyphenyl-Based Monomer Polymerization Unit (A1)

To a 250 mL round bottom flask, 9.375 g of polyethylene oxide methylether methacrylate (PEOMA), 6.875 g of N-vinyl-2-pyrrolidone (VP), 5.000 g of acrylonitrile (AN), 2.500 g of N,N-dimethylacrylamide, 1.250 g of N-(3,4-dihydroxyphenylethyl)methacrylate (DMA), and 86 g of water were added, and the inlet was sealed. Oxygen was removed via nitrogen bubbling for 30 minutes, and the reaction flask was immersed in an oil bath heated to 60° C. and then 0.03 g of VA-057 (Wako Chemical) was added, and the reaction was initiated. After 24 hours, the reaction was terminated and an acrylic copolymer was obtained (conversion rate: 99%, weight-average molecular weight: 248,000).

Preparation Example 2: Binder of Polymer Containing Hydroxyphenyl-Based Monomer Polymerization Unit (A2)

A polymer was prepared in the same manner as in Preparation Example 1, except that the monomer used in the polymerization and the weight ratio thereof are adjusted as shown in Table 1 below.

Preparation Example 3: Binder of Polymer Containing Disulfide-Based Monomer Polymerization Unit (A3)

To a 250 mL round bottom flask, 9.375 g of polyethylene oxide methylether methacrylate (PEOMA), 6.875 g of N-vinyl-2-pyrrolidone (VP), 5.000 g of acrylonitrile (AN), 2.500 g of N,N-dimethylacrylamide, 1.250 g of 2-(pyridyl disulfide)-methyl methacrylate (SSMA), and 86 g of water were added, and the inlet was sealed. Oxygen was removed via nitrogen bubbling for 30 minutes, and the reaction flask was immersed in an oil bath heated to 60° C. and then 0.03 g of VA-057 (Wako Chemical) was added, and the reaction was initiated. After 24 hours, the reaction was terminated and an acrylic copolymer was obtained (conversion rate: 99%, weight-average molecular weight: 129,000).

Preparation Example 4: Binder of Polymer Containing Disulfide-Based Monomer Polymerization Unit (A4)

A polymer was prepared in the same manner as in Preparation Example 3, except that the monomer used in the polymerization and the weight ratio thereof are adjusted as shown in Table 1 below.

TABLE 1

|  | A1 | A2 | A3 | A4 |
|---|---|---|---|---|
| PEOMA | 37.5 | 35 | 37.5 | 35 |
| VP | 27.5 | 25 | 27.5 | 25 |
| AN | 20 | 20 | 20 | 20 |
| DMAA | 10 | 10 | 10 | 10 |
| DMA | 5 | 10 | — | — |
| SSMA | — | — | 5 | 10 |
| $M_w/10^3$ | 248 | 201 | 129 | 125 |

PEOMA: Poly(ethylene oxide) methyl ether methacrylate
VP: N-vinyl-2-pyrrolidone
AN: Acrylonitrile
DMAA: N,N-dimethylacrylamide
DMA: N-(3,4-dihydroxyphenylethyl)methacrylate
SSMA: 2-(pyridyl disulfide)-methyl methacrylate Comparative Preparation Example 1: Binder of Acrylic Polymer (B1)

To a 250 mL round bottom flask, 6.0 g of acrylonitrile, 8.0 g of butyl acrylate and 60 g of N-methyl-2-pyrrolidone (NMP) were added and the inlet was sealed. Oxygen was removed via nitrogen bubbling for 30 minutes, and the reaction flask was immersed in an oil bath heated to 60 and then 0.015 g of azobisisobutyronitrile (AIBN) was added, and the reaction was initiated. After 48 hours, the reaction was terminated and an acrylic copolymer was obtained (conversion rate: 93%, weight-average molecular weight: 220,000).

Comparative Preparation Example 2: Binder of Mixture of Styrene-Butadiene Rubber (SBR) and Carboxymethyl Cellulose (CMC) (B2)

Styrene-butadiene rubber (SBR) and carboxymethylcellulose (CMC) were reagents from Sigma-Aldrich and Daicel, respectively, and a binder was prepared by mixing styrene-butadiene rubber (SBR) and carboxymethyl cellulose (CMC) at a weight ratio of 7:3.

2. Performance Evaluation of Binder
(1) Experimental Method
Method of Measuring Conversion of Polymer
The conversion rate is determined by gas chromatography (PerkinElmer) after diluting with a solvent in a concentration of 20 mg/mL and adding 5 mg/mL of toluene as a standard material. The conversion rate is calculated from the change in the ratio of the size of the monomer peak to the area of the toluene peak.
<Analysis Condition>
Solvent: Tetrahydrofuran
Initial temperature: 3 minutes at 50° C., ramp: raising to 200°C. by 30°C./min.
Injection volume: 0.5 μL
<Calculation of Conversion Rate>

Conversion Rate (%)=$(A_{ini}-A_{fin})/A_{ini} \times 100$, wherein $A_{ini}$: relative ratio of the area of the monomer peak to the peak of the toluene at the start of the reaction, and
$A_{fin}$: relative ratio of the area of the monomer peak to the peak of the toluene at the end of the reaction.
Method of Measuring Molecular Weight of Polymer
The weight-average molecular weight (Mw) and the molecular weight distribution (PDI) were measured using GPC under the following conditions, and the measurement results were converted using the standard polystyrene of the Agilent system for the calibration curve.
<Measurement Condition>
Measurement device: Agilent GPC (Agilent 1200 series, U.S.)
Column: PLGel-M, PLGel-L serial connection
Column temperature: 40° C.
Eluent: N,N-dimethylformaldehyde
Flow rate: 1.0 mL/min
Concentration: ~1 mg/mL (100 μL injection)
Preparation of Positive Electrode and Evaluation of Battery
Sulfur (Sigma-Aldrich) was mixed with CNT (Carbon Nanotube) using a ball mill and then heat-treated at 155° C. to prepare a sulfur-carbon composite. The prepared sulfur-carbon composite, the electrically conductive material and the binder were added to water as a solvent and mixed with a mixer to prepare slurry for forming the positive electrode active material layer. In that case, VGCF (Vapor-grown Carbon Fiber) was used as an electrically conductive material, and the polymers prepared in the above Preparation Examples were used as a binder. The mixing ratio was sulfur-carbon composite:electrically conductive material: binder of 90:5:5 in weight ratio. The composition for forming the positive electrode active material layer was coated on an aluminum foil current collector and dried at 50° C. for 2 hours to form a positive electrode (the energy density of the positive electrode: 5.5 mAh/cm$^2$). When N-methyl-2-pyrrolidone was used as the solvent, the positive electrode was prepared by drying at 80° C. for 24 hours.

Also, a lithium metal thin film was prepared as a negative electrode.

After the prepared positive electrode was positioned to face the negative electrode, the separator of polyethylene was interposed between the positive electrode and the negative electrode.

Thereafter, a lithium sulfur battery was fabricated by injecting the electrolyte into the case. In that case, the electrolyte was prepared by adding LiTFSI to a mixed solvent of dioxolane (DOL) and dimethyl ether (DME) at a concentration of 0.1 mole and adding LiNO$_3$ in an amount of 1 wt. % relative to the electrolyte solution.

Evaluation Method of Cycle Characteristics
Device: 100 mA grade charging/discharging device
Charging: 0.3 C, constant current/constant voltage mode
Discharging: 0.5 C, constant current/constant voltage mode, 1.5 V
Cycle temperature: 25° C.

(2) Evaluation of Performance of Binder

Example 1: Evaluation of Performance of Binder (A1) According to Preparation Example 1

A positive electrode was prepared using the binder (A1) prepared according to Preparation Example 1, and a battery including the positive electrode, a negative electrode, a separator and an electrolyte solution was prepared according to the above-mentioned description. After evaluation for 100 cycles between 1.5 V and 2.6 V with 0.3 C/0.5 C charging/discharging, the remaining capacity in the second cycle and the remaining capacity in the 50th cycle relative to the initial capacity were calculated to measure the capacity retention rate. The results are shown in Table 2 below.

Examples 2 to 4: Evaluation of Performance of Binder (A2 to A4) According to Preparation Examples 2 to 4

The capacity retention rates were measured in the same manner as in Example 1, except that positive electrodes were prepared using the binders (A2 to A4) prepared according to Preparation Examples 2 to 4 above, and the results are shown in Table 2 below.

Comparative Examples 1 and 2: Evaluation of Performance of Binder (B1 and B2) According to Comparative Preparation Examples 1 and 2

The capacity retention rates were measured in the same manner as in Example 1, except that positive electrodes were prepared using the binders (B1 and B2) prepared according to Comparative Preparation Examples 1 and 2 above, and the results are shown in Table 2 below.

TABLE 2

|  | Example 1 | Example 2 | Example 3 | Example 4 | Comparative Example 1 | Comparative Example 2 |
| --- | --- | --- | --- | --- | --- | --- |
| Binder | A1 | A2 | A3 | A4 | B1 | B2 |
| Binder solvent | Water | Water | Water | Water | NMP | Water |
| Glass transition temperature (Tg) | 45 | 45 | 29 | 29 | −6 | −65 |
| Capacity retention rate (%) | 64 | 66 | 63 | 59 | 60 | 22 |

According to the above Table 2, when the polymer containing the hydroxyphenyl-based or disulfide-based functional group according to the present invention was used as a water-soluble binder, as in Examples 1 to 4, it was confirmed that the capacity retention rate with the progress of the cycles was considerably higher than that of Comparative Example 2 using the binder solvent of the same water. These results are considered to be due to the fact that the hydroxyphenyl-based or disulfide-based functional group according to the present invention combined with the components in the electrode active layer to form a stable electrode with high resistance physically and chemically to the electrolyte solution and effectively inhibited the leaching of the sulfur-based material into the electrolyte solution by assisting the adsorption and reduction reaction of the polysulfide.

Particularly, since the polymer containing a hydroxyphenyl-based or disulfide-based functional group of the present invention has a glass transition temperature of room temperature (25° C.) or higher, it is considered that the rigidity of the binder is increased at the time of the stability evaluation at room temperature, and thus the long-term cycle characteristics is also increased. Although Examples 1 to 4 exhibited similar or slightly better capacity retention rates as compared to Comparative Example 1, since the hydroxyphenyl-based and disulfide-based polymers according to the present invention can use with water as a dispersing solvent, the drying time of the electrode is much reduced and the drying temperature is lowered, as compared to the case of using NMP, so that high productivity in terms of time and energy can be obtained.

As can be seen from the above description, the hydroxyphenyl-based or disulfide-based functional group-containing polymer of the present invention has an excellent effect in improving the cycle characteristics of the lithium-sulfur secondary battery. The battery using the thus prepared positive electrode exhibits excellent cycle characteristics, and makes it possible to ensure a high manufacturing productivity.

It is intended that the present invention cover the modifications and variations of this invention, and the specific scope of protection of the present invention will be clarified by the appended claims.

The invention claimed is:

1. A binder for preparing a positive electrode of a lithium-sulfur secondary battery comprising an acrylic polymer,
    wherein the acrylic polymer comprises a unit formed from a hydroxyphenyl-based monomer or a disulfide-based monomer,
    wherein the hydroxyphenyl-based monomer is a compound selected from the group consisting of 1,2-dihydroxyphenyl ethyl methacrylate, 1,2-dihydroxyphenyl butyl methacrylate, 1,2-dihydroxyphenyl dodecyl methacrylate, 3,4-dihydroxyphenyl ethyl methacrylate, and combinations thereof, and
    wherein the disulfide-based monomer is a compound selected from the group consisting of allyl disulfide, disulfide dimethacrylate, hydroxyethyl pyridyl disulfide, 2-(pyridyl disulfide)-methyl methacrylate, and combinations thereof.

2. The binder for preparing the positive electrode of the lithium-sulfur secondary battery according to claim 1,
    wherein the acrylic polymer comprises 1 to 20 wt. % of units formed from the hydroxyphenyl-based monomer.

3. The binder for preparing the positive electrode of the lithium-sulfur secondary battery according to claim 1,
    wherein the acrylic polymer comprises 1 to 20 wt. % of units formed from the disulfide-based monomer.

4. The binder for preparing the positive electrode of the lithium-sulfur secondary battery according to claim 1,
    wherein the acrylic polymer has a glass transition temperature between 25 to 50° C.

5. A composition for preparing a positive electrode of a lithium-sulfur secondary battery comprising the binder according to claim 1, a positive electrode active material, and an electrically conductive material.

6. The composition for preparing the positive electrode of the lithium-sulfur secondary battery according to claim 5, wherein the composition comprises 0.01 to 10 parts by weight of the binder based on 100 parts by weight of a solid content in the composition.

7. The composition for preparing the positive electrode of the lithium-sulfur secondary battery according to claim 5,
    wherein the composition comprises 30 to 95 parts by weight of the positive electrode active material based on 100 parts by weight of a solid content in the composition.

8. The composition for preparing the positive electrode of the lithium-sulfur secondary battery according to claim 5,
    wherein the composition comprises 2 to 60 parts by weight of the electrically conductive material based on 100 parts by weight of a solid content in the composition.

9. A positive electrode comprising a current collector and a positive electrode active material layer, wherein the positive electrode active material layer is formed by a process comprising coating the composition according to claim 5 on the current collector.

* * * * *